Patented July 8, 1952

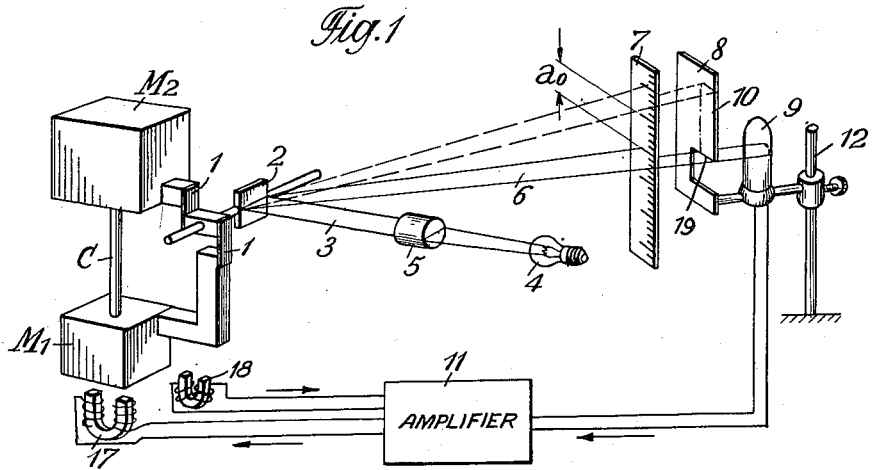
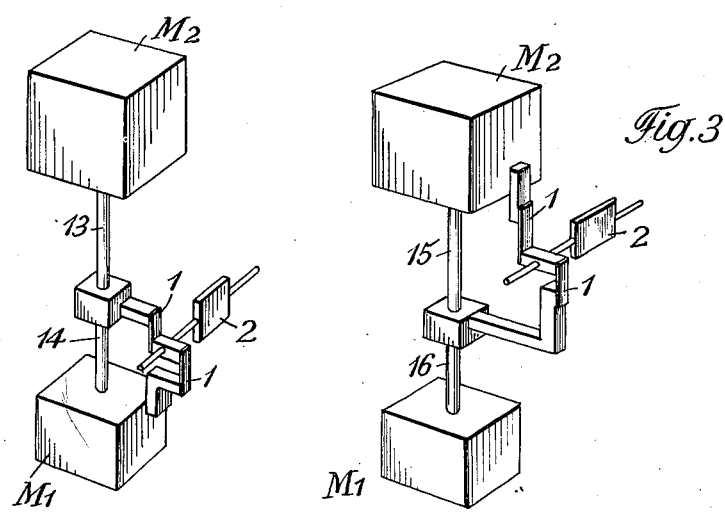

2,602,326

UNITED STATES PATENT OFFICE 2,602,326

AUTOMATIC AMPLITUDE REGULATOR FOR ELECTRON TUBE ACTUATED OSCILLATION TESTING MACHINES

Max Russenberger, Schaffhausen, Switzerland, assignor to Alfred J. Amsler & Co., Schaffhausen, Switzerland Application June 18, 1945, Serial No. 600,072
In Switzerland March 7, 1945

4 Claims. (Cl. 73—67)

This invention relates to amplitude regulators for oscillation testing machines being actuated and relieved respectively by electron tube means.

With oscillation testing machines of this kind it is advantageous to measure and regulate the load amplitude or the amplitude of travel of the object tested by mechanically operating means. In connection therewith the amplitude measuring is advantageously effected by means of a mirrow which is actuated by the load amplitude or the amplitude of travel of the object treated in mechanically rigid fashion and which projects in optical manner a light beam on a scale and a photoelectric cell.

The present invention has for its object an automatic amplitude regulator for oscillation testing machines which are actuated and relieved respectively by electron tube means and in which the limits of oscillation of the object to be tested act in optically magnified state on the actuation means via a photoelectric member, in such manner, that the mechanical amplitude is maintained constant. By virtue of this combination of a known mechanical oscillographic measuring apparatus with a photoelectric member, which is influenced by amplitude peak values and lends itself in conjunction with an amplifier to maintain constant an absolute value of mechanical amplitude, the properties of the intermediary members used, for example, the amplifying ratio of the amplifier, the sensitiveness of the photoelectric cell, the intensity of the light source and so forth are not affected by the measuring operation.

Exemplifications of the invention are illustrated in the accompanying drawings in which:

Fig. 1 is a perspective elevational view of an apparatus according to the present invention;

Fig. 2 shows a modified exemplification, and

Fig. 3 shows a further modified exemplification.

In Fig. 1 $M_1$ and $M_2$ designate masses of a mechanical oscillatory two-mass-system of an oscillation testing machine, whereas C refers to a spring member, e. g. a steel tube, which is to be deformed elastically in the longitudinal direction. Instead of the spring member C a test bar or a measuring element may be used. The entire system is suspended so as to oscillate freely. The mass $M_1$ is of magnetic material. The natural frequency of the oscillating system may be written $$f = \frac{1}{2\pi}\sqrt{\frac{C}{\frac{M_1 M_2}{M_1 + M_2}}}$$

When brought into a state of oscillation, the system will oscillate with this natural frequency, the travels of the masses $M_1$ and $M_2$ being different according to their different value. This difference of travel will be present as the elongation of the member C. The oscillation is picked up by the pick-up 18 and is transmitted to the amplifier 11, from there the driving magnet 17 is supplied with an alternating current synchronous to the oscillations. The relative travel between the masses $M_1$ and $M_2$ is transmitted to a mirror 2 by way of transmission means 1, e. g. thin steel bands. This mirror reflects a beam of light 3 which emanates from the incandescent filament of lamp 4 and is rectified by an objective lens 5. As a result of oscillation the reflected light beam 3 appears as a band of light on the transparent scale 7.

Consequently, the angular range of the projected band of light on the scale 7 corresponds directly to the measure of the relative amplitude between the swinging masses $M_1$ and $M_2$, that is, the spring force of the spring member C.

As shown in Fig. 1, a part of the band of light 6 is projected past the scale 7 onto an edging diaphragm 8, having a slot 19, and a photoelectric cell 9 which is arranged behind said diaphragm. When adjusted to the optimum amplification the slightest causes, e. g. the normal fluctuations of voltage in the circuit, or the slightest mechanical disturbances, will be sufficient to start oscillation without external stimulus. As the mirror oscillates the band of light 10 is projected onto the edging diaphragm 8 exclusively as long as the amplitude is smaller than the stretch $a_0$. Therefore, no light is projected into the photoelectric cell 9 and under these conditions the amplifier 11 delivers a maximum of effort to the actuating mechanism of the driving magnet 17. The pick-up magnet is designated 18. The amplifier 11 supplies enough power to the driving magnet 17 to compensate for the damping of the material of C and for the damping by external air-friction. As the system swings with its natural frequency, the amplitude of travel increases, as long as the length of the light band on the scale 7 does not exceed the predetermined adjustable value $a_0$.

As soon as the amplitude $a_0$ becomes so great that light rays are projected into the photoelectric cell 9 by bypassing the edging diaphragm 8 the cell delivers current impulses of short duration amounting only to a fraction of the period required for completing an oscillation. These impulses are in opposite phase to the impulses of the pick-up 18. These current impulses tend to decrease the output of the amplifier the more the edging diaphragm 8 is bypassed by the beam of light so that the amplitude is prevented from increasing further. The edging diaphragm 8 and the photoelectric cell 9 are mounted in common on a slide rack 12 so as to permit of being displaceably adjusted in the direction of the amplitudes in adaptation to any amplitude length that may arise.

Fig. 2 illustrates an exemplification in which between the oscillating masses $M_1$ and $M_2$ a spring member C which is composed of a test bar 13 and a measuring element 14 is arranged. This measuring element consists of an elastic member having a known proportionality between load and elongation, the elongation of the measuring element thus constituting a measure of the load acting upon the meauring element. In this arrangement the elastic measuring element is utilised for measuring the load applied, whereas the amplitude of said member as optically magnified is utilised for the regulation. Measurement of the load applied, that is to say of the elongation undergone by the measuring element under the influence of the load to be measured, is effected by conventional means not shown in the drawings, e. g. by strain gages. The optical transmission members as such are not shown. These are exactly like those used in the arrangement shown in Fig. 1.

In the further exemplification, as shown in Fig. 3, between the oscillating masses $M_1$ and $M_2$ again a spring member C is interposed which is composed of a test bar 15 and a measuring element 16 which serves for measuring the load applied. In this case the optically magnified amplitude of travel of the test bar is utilised for the regulation. The optical transmission means, not being shown, are exactly like those used in the arrangement as shown in Fig. 1.

Instead of applying the present invention to arrangements for use with testing machines for tensile and compressive tests, it can be accordingly applied also to testing machines for shearing, torsional and bending tests for the purpose of making oscillation tests.

I claim:

1. In an oscillation testing machine employing automatic regulation of the amplitude of vibration of the object to be tested, an oscillating system comprising two masses for connection of an elastic member therebetween, an amplifier, a pick-up associated with said two masses, a driving electromagnet receiving current impulses synchronous with the oscillation of one of the said masses from said amplifier, said current impulses being the amplified values of the impulses fed into said amplifier by said pick-up, said pick-up being actuated by one of the said masses, a mirror pivotally mounted on one of said masses and connected to the other of the masses to swing in response to the relative movement of said masses through an angle proportional to the distance between said two masses in each moment, a source of light emitting a beam of light, a graduated scale, said beam of light being reflected from said mirror onto said graduated scale, said scale being provided with a slidably mounted edging diaphragm having a slot, a photoelectric cell so arranged as to catch the light of the beam falling through said slot thereby feeding current impulses to said amplifier synchronously with the impulses fed to said amplifier by said pick-up and in opposite phase to the latter, whereby the output of said amplifier is regulated to keep the amplitude of vibration of the elastic member between the two masses constant.

2. An oscillation testing machine according to claim 1 and in which the elastic member between the masses comprises the test-piece and a member of known proportionality between load and elongation, the test-piece being connected in series with said members of known characteristics, and said mirror being actuated by the variation of length of said elastic member.

3. An oscillation testing machine according to claim 1 and in which the elastic member between the masses comprises the test-piece and a member of known proportionality between load and elongation, the test-piece being connected in series with said member of known characteristics and in which the test-piece is subjected to oscillation in an axial direction, and said mirror being actuated by the variation of length of said elastic member.

4. An oscillation testing machine according to claim 1 and in which the edging diaphragm with the slot and the photoelectric cell is adjustable relative to the graduated scale in the direction of the amplitude of the light-beam oscillations to alter and set the amplitude of oscillation to a desired limit.

MAX RUSSENBERGER.

REFERENCES CITED

The following references are of record in the file of this patent:

UNITED STATES PATENTS

| Number | Name | Date |
|---|---|---|
| 2,343,963 | Kent | Feb. 29, 1944 |

FOREIGN PATENTS

| Number | Country | Date |
|---|---|---|
| 397,167 | Great Britain | Aug. 14, 1933 |